United States Patent [19]

Whitfield

[11] 3,734,194
[45] May 22, 1973

[54] PEANUT SHAKER DIRT REMOVER

[75] Inventor: Carroll J. Whitfield, Columbus, Ga.

[73] Assignee: Kelley Manufacturing Company, Tifton, Ga.

[22] Filed: June 1, 1971

[21] Appl. No.: 148,404

[52] U.S. Cl. ..................................171/101
[51] Int. Cl. ..............................A01d 17/08
[58] Field of Search.....................171/127, 101

[56] References Cited

UNITED STATES PATENTS

| | | | |
|---|---|---|---|
| 990,522 | 4/1911 | Bridger | 171/127 |
| 1,061,568 | 5/1913 | Reuther | 171/127 |
| 1,163,348 | 12/1915 | Kendall | 171/127 |
| 2,071,325 | 2/1937 | Bateman et al. | 171/127 |
| 2,468,639 | 4/1949 | Sample | 171/127 |
| 2,172,435 | 9/1939 | Cook | 171/127 |
| 3,224,510 | 12/1965 | Loosli | 171/127 |

*Primary Examiner*—Antonio F. Guida
*Attorney*—Jones & Thomas

[57] ABSTRACT

A peanut shaker for use with plows and an inverter for harvesting peanuts, wherein mature peanut laden plants are simultaneously removed from adjacent rows of plants in the ground, elevated above the ground, shaken to remove the dirt from the plants, and deposited back on the ground in a wind row. The shaker comprises a conveyor with rattler bars movable up an inclined path to move the plants from the plows to the inverter. Rattler bar elevating wheels are located between the upper and return flights of rattler bars and are arranged to be engaged by the rattler bars moving in the upwardly inclined direction of the upper flight so that the rattler bars and the plants carried thereby are jarred in an upward direction causing the dirt to be removed from the peanut plants.

4 Claims, 2 Drawing Figures

PATENTED MAY 22 1973

3,734,194

INVENTOR
CARROLL J. WHITFIELD

BY
Jones & Thomas
ATTORNEYS

PEANUT SHAKER DIRT REMOVER

BACKGROUND OF THE INVENTION

In harvesting peanuts, it is common practice to dig the peanut plants from the earth, shake the dirt from the roots of the plants, and stack the plants for drying. The machinery utilized to perform these basic functions usually comprises a plow pulled through the earth by a tractor, and a shaker or inclined conveyor which lifts the plants from the ground from behind the plow and elevates the plants. When the plants leave the upper end of the shaker frame, they are allowed to fall back to the earth where they are allowed to dry. Usually an inverter mechanism is utilized at the end of the shaker to invert the plants to a nuts-up attitude so that the sun and wind can dry the nuts. If the plants are inverted on the ground in this manner, they will dry quickly without having to be turned or removed to a drying area. After the nuts have been dried, the peanut laden vines can be gathered from the ground for picking the nuts from the vines.

In order to assure that the peanuts are properly dried in the wind rows, it is important that as much dirt as possible be removed from the roots and nuts. If the nuts retain large amounts of dirt, they are difficult to invert by the inverter and are inclined to fall to the ground without becoming inverted, and the dirt tends to retain the moisture in the plants so that a longer time interval is required to properly dry the nuts.

SUMMARY OF THE INVENTION

The present invention comprises apparatus for harvesting peanuts which utilizes a shaker with a conveyor having a plurality of spaced, substantially parallel rattler bars connected at their ends to a continuous driving mechanism. The rattler bars are arranged in an upper upwardly inclined flight of rattler bars extending from the rear of a plow assembly up toward an inverter, if an inverter is used, and a lower return flight of rattler bars movable in a return direction from the inverter back toward the plows. A rattler bar lifting device is supported intermediate the ends of the rattler bars and between the flights of rattler bars and functions to jar each rattler bar as it moves up the upwardly inclined path from the plows to the inverter. This abrupt jarring movement imparted to the rattler bars functions to jar the heavy, dirt laden vines and the jarring of the vines in this manner causes the dirt to be removed from and fall away from the vines. One or more of the rattler bar lifting means can be utilized to jar the vines in more than one location along the upwardly inclined path.

Thus, it is an object of this invention to provide apparatus for harvesting peanuts which is inexpensive to manufacture, easy to maintain, and which functions to remove a large amount of the dirt from the vines and the nuts of peanut plants or other plants as one or more rows of plants are harvested.

Another object of this invention is to provide a shaker for use with peanut harvesting plows and possibly with a peanut plant inverter, the shaker being capable of thoroughly shaking or jarring the peanut vines to remove a major portion of the dirt and other matter clinging to the roots, vines and nuts of the plants.

Other objects, features and advantages of the present invention will become apparent upon reading the following specification, when taken in conjunction with the accompanying drawing.

DESCRIPTION OF A PREFERRED EMBODIMENT

Figure 1:
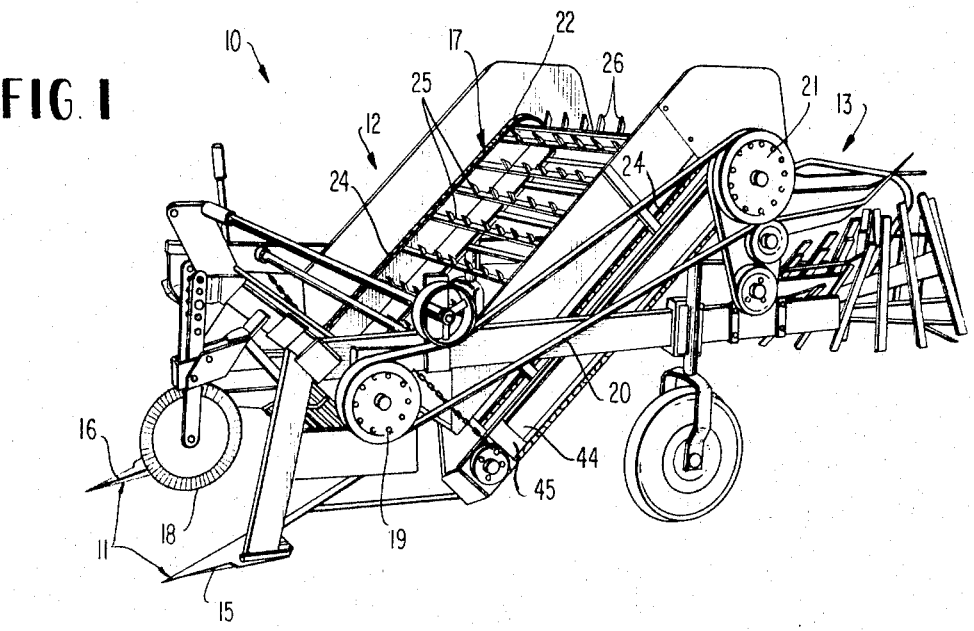
FIG. 1 is a perspective view of an apparatus for harvesting peanuts.

Referring now more particularly to the drawing, wherein like characters of reference designate corresponding parts throughout several views, FIG. 1 shows a peanut harvester 10 which includes a plow assembly 11, shaker 12 and inverter 13. Peanut harvester 10 is of a width sufficient to span two adjacent rows of peanuts; however, it should be understood that other width harvesters, such as four row harvesters, can embody this invention.

Plow assembly 11 includes plows 15 and 16 for unearthing the plants and colter 18 for cutting the vines and roots which extend between the adjacent rows of vines. Similar colters can be carried by the tractor (not shown) on the outside of the adjacent rows of peanut plants to cut the vines and roots extending beyond the adjacent rows.

Figure 2:
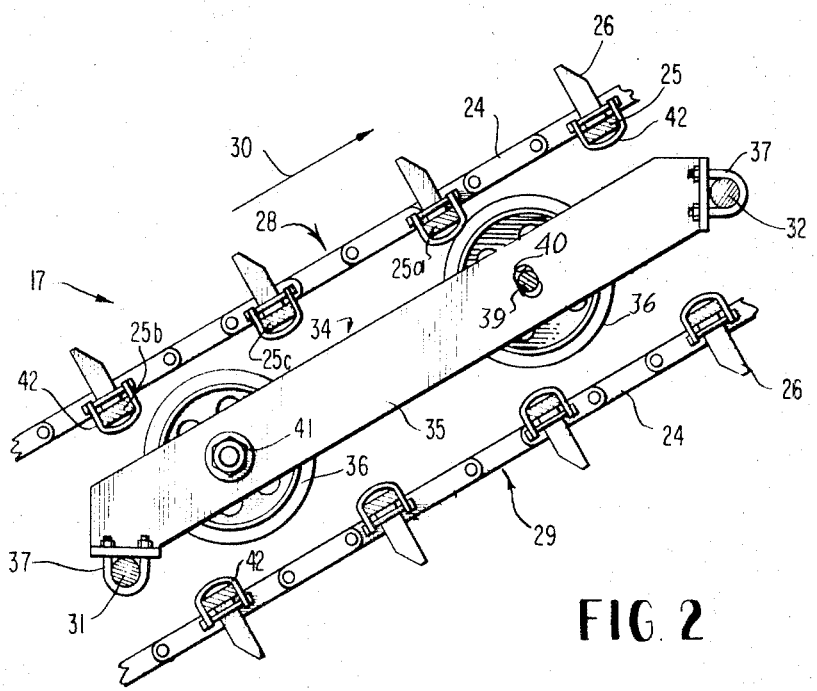
FIG. 2 is a detail showing, with parts shown in section, of the shaker.

The power take off of the tractor is connected to shaker 12 and functions to drive driving pulley 19. Driving belt 20 extends up to the upper end of shaker 12 to drive driven pulley 21. Driven pulley 21 rotates upper sprockets 22 at opposite sides of shaker 12, and a continuous driving member such as roller chain 24 is driven by each sprocket 22. Similar driven sprockets (not shown) are located at the lower end of shaker 12 and are driven by roller chains 24. A plurality of rattler bars 25 are connected in spaced substantially parallel arrangement at their ends to roller chains 24. Each rattler bar includes a plurality of spaced vine lifting spikes 26 along its length. The arrangement is such that an upwardly inclined flight 28 (FIG. 2) of rattler bars comprise an upper flight of rattler bars, and a downwardly inclined return flight 29 of rattler bars forms a lower flight of rattler bars. The rattler bars 25, sprockets 22 and other moving elements of the shaker function as a conveyor 17, and the upwardly inclined flight 28 of rattler bar 25 normally moves in an upwardly inclined path in the direction indicated by arrow 30.

Shaker 12 includes a framework having two or more laterally extending support bars or struts 31 and 32 which are located between the upper and lower conveyor flights 28 and 29. Rattler bar lifting assembly 34 is connected to support bars 31 and 32 and includes support frame 35, lifting wheels 36, and clamps 37. Lifting wheels 36 are rotatably supported by support frame 35 with their axles 39 extending through elongated slots 40 in the support frame. The placement of the axles 39 can be adjusted and the axles retained in the desired location within the slots 40 by means of bolts 41. Rattler bar lifting assembly 34 is located intermediate the ends of rattler bars 25, preferably at the center of the rattler bars. The placement of the rattler bar lifting assembly 34 at the center or offset from the center of the rattler bars can be adjusted by sliding clamps 37 along the support bars 31 and 32 of the conveyor frame and tightening the clamps. Normally, rattler bar shoes 42 will be attached to and become a part of the rattler bars 25. Shoes 42 are of a width slightly wider than the width of lifting wheels 36 and are generally U-shaped in cross section. Shoes 42 are bolted to the rattler bars so that the rounded portion of the U-shaped shoes 42 engage lifting wheels 36. Of course, lifting shoes 42 as well as vine lifting spikes 26 are inverted and extend generally in a downward direction as the rattler bars 25 move through their return flight.

In order that the slack in roller chains 24 be adjusted, the side frames 44 of rattler 12 are expandable and contractable through a conventional coupling 45 (FIG. 1).

OPERATION

When the peanut harvester 10 is placed in operation, its draw bar is connected to a conventional tractor and its power take off shaft is connected to the power shaft of the tractor. When the plows of plow assembly are pulled through the earth under adjacent rows of peanut plants, the plows tend to unearth the plants. The power mechanism of the tractor drives conveyor 17 through driving pulley 19, driving belt 20 and driven pulley 21. The vine lifting spikes 26 move with rattler bars 25 along the return flight 29 and then around the lower sprockets (not shown) where they are adjacent the ground and will tend to lift and carry with them the plants unearthed by plow assembly 11. The plants will move with the rattler bars up the upwardly inclined path 30 along the upper flight 28 of the rattler bars toward inverter 13. The weight of the upper flight 28 of rattler bars 25 as well as the weight of the plants cause the upper flight of rattler bars to droop between the upper and lower sprockets of the conveyor toward rattler bars lifting assembly 34. As each rattler bar 25 passes over the first or lower lifting wheel 36, it engages the lower lifting wheel. The rapid movement of the rattler bars causes the engagement of the rattler bars against the lifting wheels to abruptly lift or jar the rattler bars in an upward direction generally normal to the movement of the rattler bars in path 30. Shoes 42 on the rattler bars 25 bear the contact between the lifting wheels 36 and the rattler bar so as to minimize the deterioration of the rattler bars and lifting wheels, and to spread the force imparted to the rattler bars from the lifting wheels over a larger surface area of the rattler bars.

When the peanut plants are heavily laden with dirt, the plants will be heavy and cause the upper flight 28 of rattler bars 25 to droop further toward rattler bar lifting assembly 34. Thus, the rattler bars 25 will tend to engage lifting wheels 36 sooner or at a lower elevation of the periphery of the lifting wheels, where the curvature of the lifting wheels is closer to being perpendicular to the direction of movement of the rattler bars 25 along path 30 so that a more abrupt jarring movement is imparted to each rattler bar. Of course, when the plants carry smaller amounts of dirt, or drier dirt, etc., the rattler bars will not droop as far toward rattler bar lifting assembly 34 and will engage a shorter arc of lifting wheels 36, and the portion of the lifting wheels 36 first engaged by the rattler bars will be closer to the angle parallel to the direction of movement of the rattler bars 25 along path 30. Thus, a smaller jarring force normal to the direction of movement of the rattler bars is imparted to the lighter plants which normally would be carrying smaller amounts of dirt. The result is that the lighter vines carrying the dryer or smaller amounts of dirt have the dirt removed from the plants with a smaller power requirement from the driving vehicle, yet the heavier plants carrying more or wetter dirt will automatically receive a more vigorous jarring force from the rattler bar lifting assembly 34. The jarring force applied to the plants can be adjusted by changing the slack in roller chains 24, with an adjustment in the length of rattler frame 44 at 45.

Since rattler bar lifting assembly 34 is positioned intermediate the ends of the rattler bars 25, preferably at the middle portion of the rattler bars, the jarring forces applied to the rattler bars from the rattler bar lifting assembly is imparted primarily only to the rattler bars, and only a small amount of movement is imparted to the continuous roller chains 24, conveyor frame and other elements of the shaker 12. Moreover, the most vigorous movement of the rattler bars 25 is felt intermediate the ends of the rattler bars at the rattler bar lifting assembly 34. The resiliency of the rattler bars 25 allows for some bending of the rattler bars as they are engaged by the lifting wheels 36.

Lifting wheels 36 are spaced apart a distance which is different from the spacing between the rattler bars or a multiple of the spacing between rattler bars, so that the rattler bars will be engaged out of phase by the lifting wheels 36. For instance, as rattler bar 25a is first engaged by upper lifting wheel 36, rattler bar 25b has not yet been engaged by lower lifting wheel 36 while rattler bar 25c has already been initially engaged by lower lifting wheel 36 and is at the end of its arc of contact with lower lifting wheel 36. This out of phase engagement of the rattler bars with the lifting wheels keeps the upper flight 28 from developing a swing or harmonic movement along the length of the upper flight, and the individual rattler bars are individually shocked or jarred by the lifting wheels and develop the jarring movement necessary to perform the optimum dirt removal function on the peanut plants.

While a pair of lifting wheels 36 has been disclosed, virtually any number of lifting wheels intermediate the ends of said rattler bars can be utilized for jarring the rattler bars. For instance, one or several lifting wheels 36 can be utilized. Moreover, while the lifting wheels function as lifting means, other lifting means can be utilized to perform the lifting function, such as rollers, cam surfaces, etc. Also, while the invention has been disclosed as using a single rattler bar lifting assembly 34 at the center of the shaker 12, two or more rattler bar lifting assemblies 34 can be laterally spaced apart and connected to support bars 31 and 32 if desired. This arrangement might be desirable on a wider four or six row rattler.

While this invention has been described in detail with particular reference to preferred embodiments thereof, it will be understood that variations and modifications can be effected within the spirit and scope of the invention as described hereinbefore and as defined in the appended claims.

I claim:

1. Apparatus for harvesting peanuts comprising a shaker including a framework, a conveyor mounted on said framework, said conveyor including a plurality of spaced parallel rattler bars connected at their ends to continuous driving members and arranged in an upper upwardly inclined flight of rattler bars movable in the upwardly inclined direction on said framework and a lower flight of rattler bars movable in a return direction, at least one rattler bar lifting wheel mounted in a stationary position on said framework and located between the upwardly inclined flight of rattler bars and the lower flight of rattler bars at the middle portions of the rattler bars and at an elevation where the rattler bars of the upwardly inclined flight of rattler bars engage and rotate said rattler bar lifting wheels and the middle portions of the rattler bars are accelerated upwardly by said rattler bar lifting wheels as the rattler bars move in an upwardly inclined direction on said framework, the spacing between adjacent ones of said rattler bars and the diameter of and placement of said at least one rattler bar lifting wheel being arranged so that during normal operation of the shaker only one rattler bar is in engagement with a rattler bar lifting wheel.

2. The apparatus of claim 1 and wherein said at least one rattler bar lifting wheel comprises a plurality of rattler lifting wheels spaced apart along the upper flight of rattler bars at distances different from the spacing of adjacent rattler bars and arranged to lift the rattler bars out of phase as the rattler bars move along their upwardly inclined flight.

3. An apparatus for harvesting peanuts including plow means movable through the ground to unearth peanut plants and a conveyor having a plurality of rattler bars movable in an upwardly inclined direction for retrieving the plants from the ground and moving the plants in an upwardly inclined direction as the apparatus moves along the ground, the improvement therein of said conveyor including circular rotatable rattler bar lifting wheels mounted in stationary positions on said conveyor intermediate the ends of said rattler bars and arranged to sequentially and individually engage the lift the middle portion of each rattler bar as each rattler bar moves in the upwardly inclined direction, whereby each rattler bar engages a lifting wheel in an out-of-phase relationship with respect to the other rattler bars.

4. The invention of claim 3 and wherein said conveyor includes a framework with at least two laterally extending generally parallel support bars, and wherein said bar lifting wheels are supported by adjacent ones of said support bars.

* * * * *